Dec. 6, 1949     A. A. BERNARD     2,490,024
AUTOMATIC ARC WELDING APPARATUS
Filed July 10, 1947     5 Sheets-Sheet 1
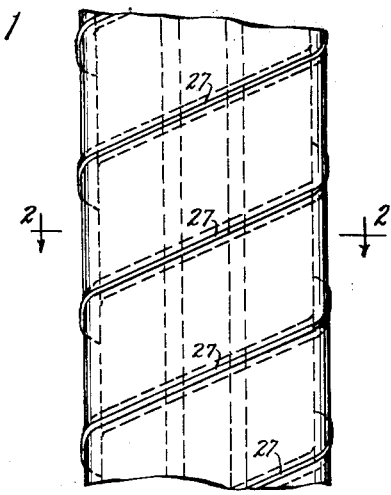
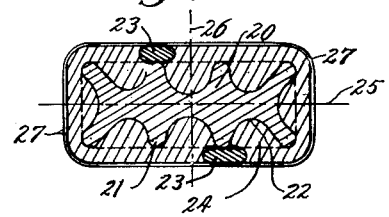
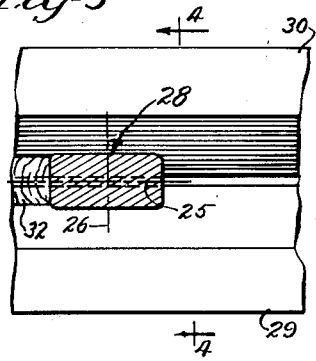
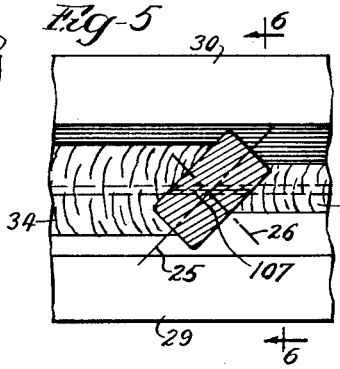
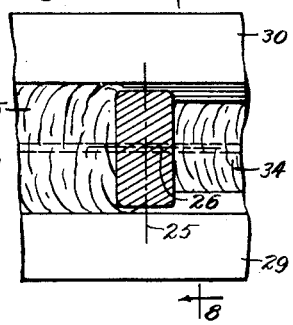
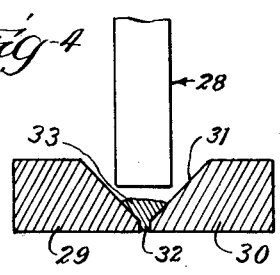
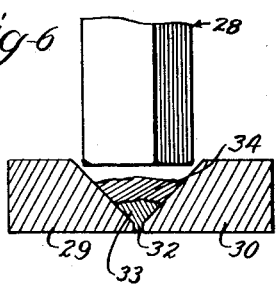
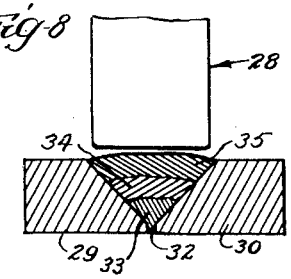
Inventor
Arthur A. Bernard
By: Mann and Brown
Attys.

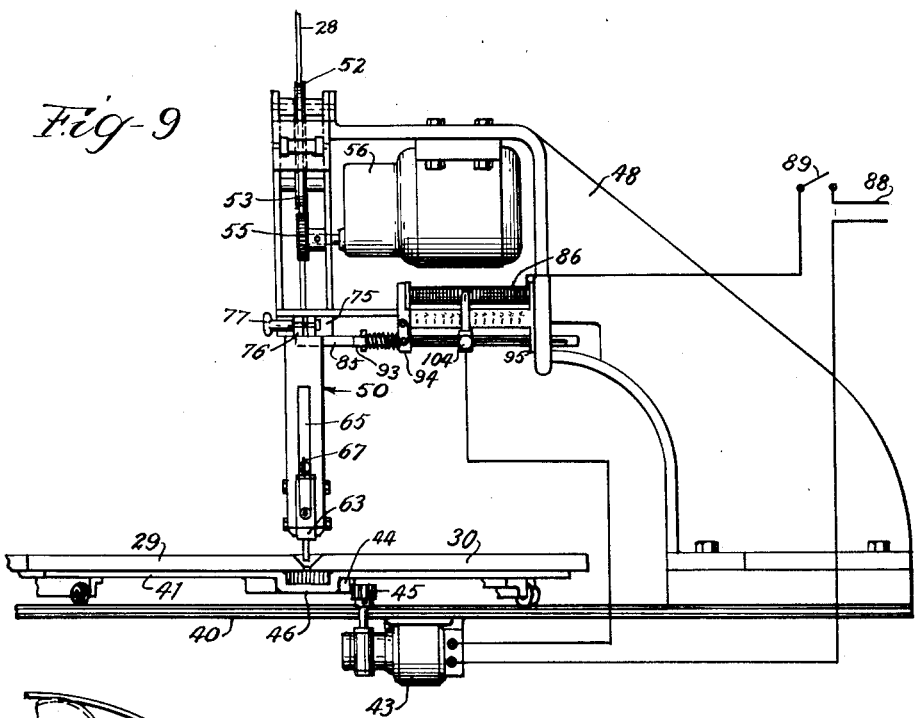

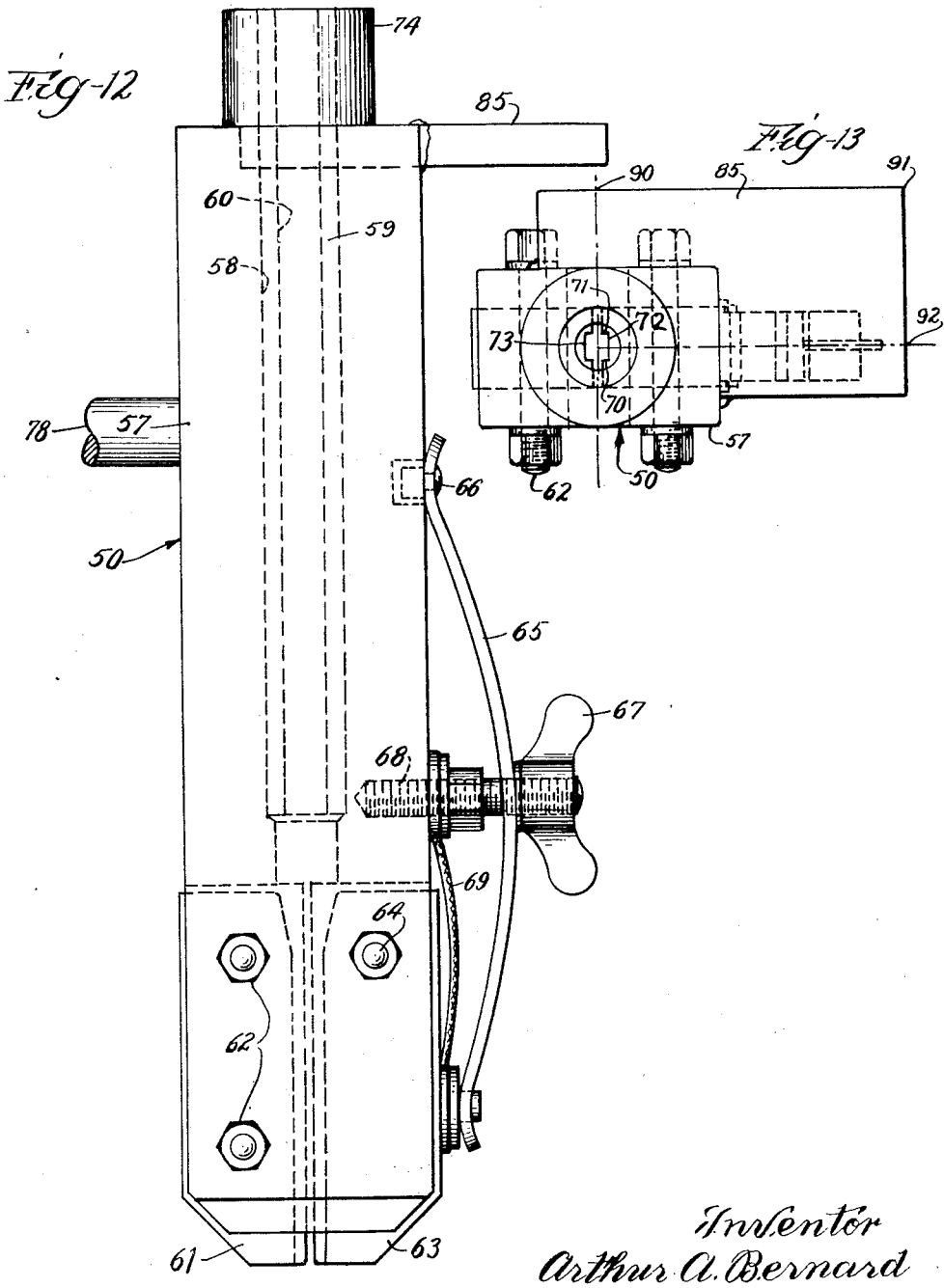

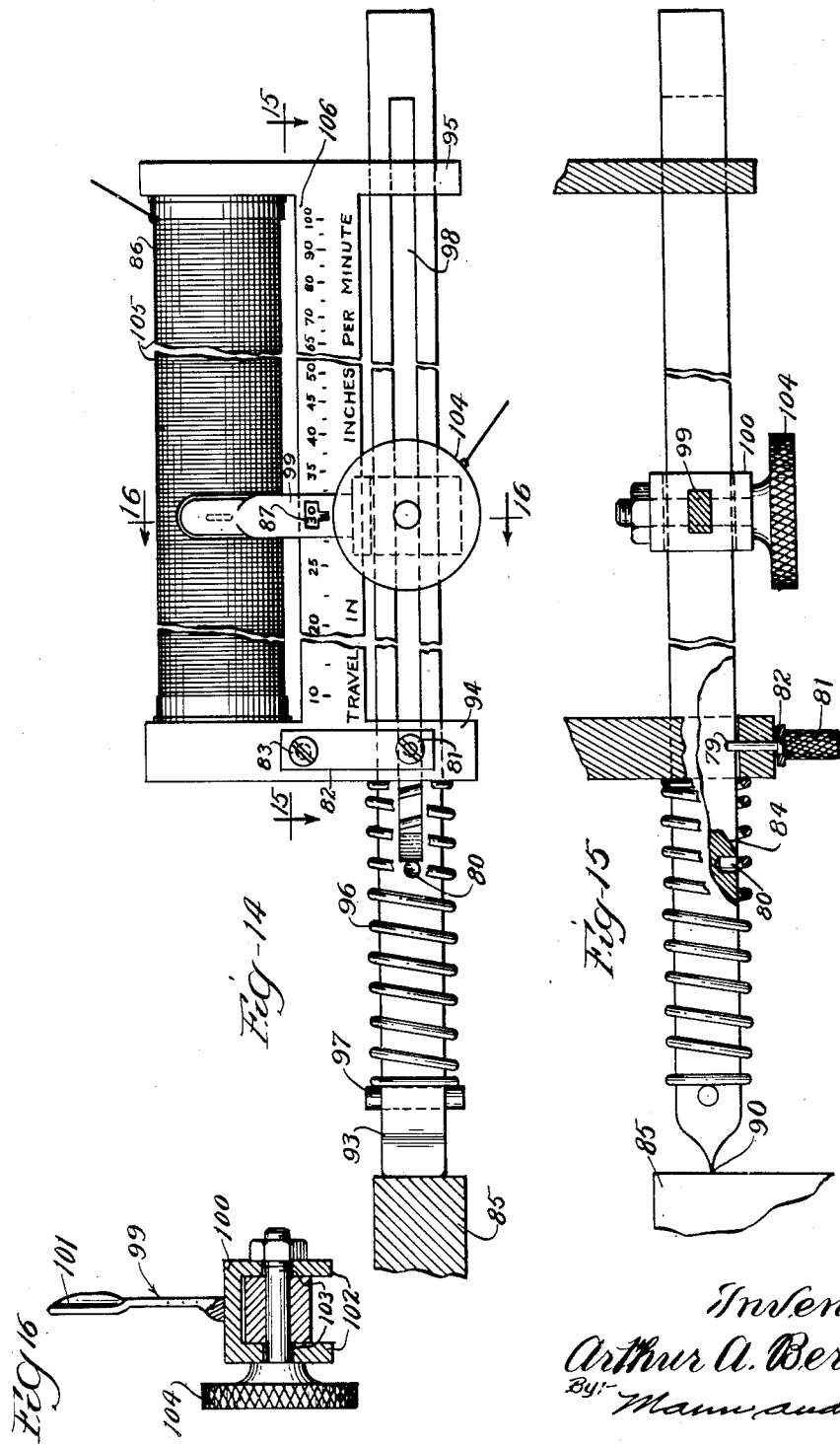

Dec. 6, 1949          A. A. BERNARD          2,490,024
AUTOMATIC ARC WELDING APPARATUS
Filed July 10, 1947          5 Sheets-Sheet 5
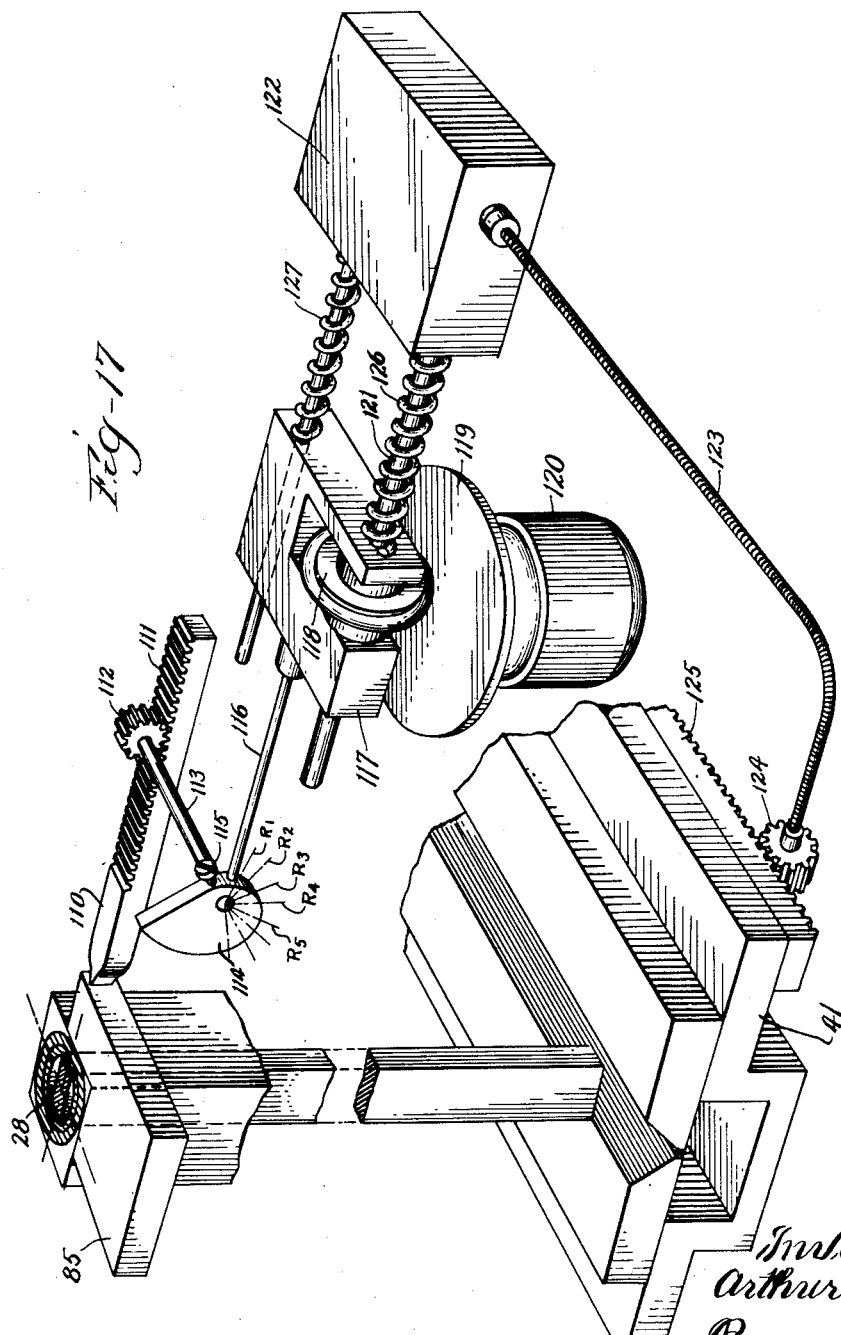
Inventor
Arthur A. Bernard
By:- Mann and Brown
Attys.

Patented Dec. 6, 1949

2,490,024

UNITED STATES PATENT OFFICE 2,490,024

AUTOMATIC ARC WELDING APPARATUS

Arthur A. Bernard, Chicago, Ill., assignor to National Cylinder Gas Company, a corporation of Delaware Application July 10, 1947, Serial No. 759,941

16 Claims. (Cl. 219—8)

This invention relates to continuous feed or automatic welding machines and to the production of welds of various widths by such machines through the use of an electrode which in cross section is oblong, i. e., has greater breadth than width when viewed in cross section.

In welding operations with automatic welding machines it is commonly found that in making a welded seam, particularly in scarfed or V-butt joints in thick metal, it is necessary to make several passes over the joint in order to get a satisfactory weld, and, obviously the width of the seam on the last pass is substantially greater than the width of the seam made during previous passes that are farther down into the base of the welding groove. A narrow electrode such as is desirable to use to get to the bottom of the V during the first pass to maintain a short arc with good weld penetration is obviously too small for laying down the subsequent layers of weld material where, due to the sloping sides of the V, the width of the joint is considerably greater. In general, the present practice is to use a sufficiently small rod so that the first layer or pass will properly be made and provide additional power driven mechanism to weave the electrode back and forth substantially at right angles to the longitudinal line of the weld, thus increasing the width of the weld for later passes. This practice is commonly termed "stitch welding" and is generally used in preference to changing to a larger size electrode as a means of varying the size of the produced weld.

It is, therefore, an object of this invention to provide a continuous feed welding machine which may readily produce welds of varying widths and without reciprocating the electrode laterally in order to vary the width of the seam. This is accomplished by the use of an electrode of oblong cross section and by rotating the electrode with respect to its longitudinal axis to produce welds of the desired width.

A further object of this invention is to control the relative speed of travel between the welding head and the work in accordance with the angular position of the electrode with respect to the joint being welded, this preferably being controlled as a function of the intercepted line produced by the projection of the line of said travel across the cross section of the electrode to achieve a substantially uniform deposit of metal per unit of length traveled regardless of the rotative setting of the electrode.

Further and other objects of this invention will become apparent as the disclosure proceeds and the description is read in conjunction with the accompanying drawings in which Figure 1 is a side elevational view of the broad face of the type of automatic wire electrode preferably used in connection with this invention, Figure 2 is a transverse cross sectional view of the continuous wire electrode shown in Figure 1, this section being taken on the line 2—2 of that figure, Figures 3, 5 and 7 and Figures 4, 6 and 8 are top views and cross sectional views, respectively, showing how the rotation of the electrode about its longitudinal axis enables seams of different widths to be laid down, Figure 9 is a side elevational view showing a preferred embodiment of an automatic welding machine made in accordance with this invention, Figure 10 is a front elevational view of the same with parts of the frame being omitted for clarity, Figure 11 is a plan view of the machine shown in Figures 10 and 11, Figure 12 is an enlarged side elevational view of the welding head, Figure 13 is a plan view of the same, Figure 14 is a side elevational view of a special logarithmic rheostat of the type preferably used in varying the speed of the work holder carriage in relation to the width of the seam being laid down, Figure 15 is a horizontal sectional view taken on the line 15—15 of Figure 14, Figure 16 is a vertical sectional view through the rheostat arm, and Figure 17 is a diagrammatic perspective view showing a modified form of the speed control mechanism for the work holder carriage.

It should be understood that the particular embodiments of the invention shown in the drawings and hereinafter described are for the purpose of complying with section 4888 of the Revised Statutes and should not be construed as imposing limitations on the appended claims except as may be required by the prior art.

For simplicity, it will be convenient to discuss the application of this invention to the making of a welded seam along a V-butt joint, such as shown in Figures 3–8 inclusive, but the invention is not necessarily limited to this particular type of weld.

Good welding practice requires substantially uniform current densities during the welding operation in order to obtain the desired penetration of the weld and rate of deposit of the welding material. If on a particular seam too great a thickness of weld material is deposited, the more rapid cooling of the exterior of the seam will cause stresses to be set up in the weld and gas occlusions to form, both of which impair the quality of the weld. For these and other reasons, certain maximum thicknesses of weld deposits are recommended in making a multi-pass weld, and any substantial deviation from such recommended practice results in an unsatisfactory weld.

It is for this reason that conventionally in making a V-butt joint weld, a relatively small electrode is used so that it can extend into the joint in making the initial passes over the joint and then, as the seam is built up, a lateral reciprocating movement is imparted to the electrode to produce a seam of the desired width and appropriate thickness for each pass.

This conventional manner of welding a V-butt joint requires expensive equipment and takes more time than producing a weld in accordance with my invention. This is accomplished by using automatic wire, which in cross section is oblong, and rotating the wire about its longitudinal axis to present either the minor axis or the major axis of the wire to the seam, or to position the wire in some intermediate position. Additional advantages are gained by automatically controlling the speed of the work with reference to the welding head in accordance with the width of the seam being laid down.

The automatic wire or continuous wire electrode which I prefer to use is of the type shown in Figures 1 and 2 and consists of a core 20 having alternate ribs 21 and grooves 22 which give the core a longitudinally serrated surface. The core is made of the desired weld material and a spiral conductor 23 of the same or similar weld material is tightly wrapped about the core with sufficient tension to firmly engage the ribs of the core and maintain the spiral conductor in fixed position on the core.

The grooves 22 of the core and the spaces between adjacent turns of the conductor 23 are filled with suitable flux material, as shown at 24, to protect the weld deposit from the damaging effects of the atmosphere during and after the welding operation.

Specific relationships between the amount of core metal, flux in the grooves and the like are disclosed in detail in my co-pending application, Serial No. 730,995, filed February 26, 1947, and the disclosure of that application is specifically incorporated herein by reference.

It will be noted that in cross section the electrode is of oblong shape having a major axis 25 and a minor axis 26. The flux material 24 extends only to the top surface of the spiral conductor 23, leaving marginal areas 27 free of flux for coaction with contact blocks in the welding machine which enable current to be conducted laterally through the spiral conductor 23 into the core 20 of the electrode.

Referring now to Figures 3-8 inclusive, the continuous wire electrode of the type shown in Figures 1 and 2 and here designated generally 28 is shown in the manner it is used for producing a multi-pass seam in a V-butt weld. The plates to be joined are indicated at 29 and 30 and the mating edges are chamfered, as shown at 31, producing a V-shaped groove having a small rectangular throat area 32. Assuming that on each pass of the welding machine a deposit of uniform thickness is desired, the procedure according to my invention is for the electrode to be first turned so that its major axis 25 is aligned with the groove, whereupon a deposit 33 is laid down at the bottom of the groove. On the next pass the electrode is rotated about its longitudinal axis so that it is at an angle of say 45 degrees to the line of travel, and a second deposit 34 is laid down. Because on this pass of the electrode, the electrode is turned to present greater breadth to the joint, a wider seam is laid down, but it must be moved relative to the work at a slower rate in order to deposit the same thickness of weld material.

On the third and last pass over the joint (assuming a three-pass weld), the electrode may be turned, as in Figures 7 and 8, with the minor axis 26 aligned with the groove, and, in this position, a still wider deposit 35 is laid down and the rate of movement between the electrode and the work must be still slower than that when operating the electrode in the position shown in Figures 5 and 6.

The present invention, in addition to providing means for supporting the electrode in any desired angular position relative to the line of seam, also provides means for automatically controlling the relative speed between the work and the electrode in order to obtain substantially uniform depths of deposit on the various passes made over the joint to be welded.

Referring now to Figures 9-11, inclusive, there is shown an automatic welding machine incorporating the principles of this invention. The machine consists of a bed 40 upon which is mounted a work holder carriage 41 running on tracks 42 and being driven by a motor 43 through a rack 44 secured to the underside of the carriage 41 and a driving pinion 45 in mesh therewith. The carriage is depressed, as indicated at 46, along a line directly under the joint to be welded, and the work consisting of the plates 29 and 30 rests upon the carriage 41 and is securely clamped thereto. The V-joint to be welded is indicated at 47.

A frame 48 rises from the bed 40 and carries a feed mechanism, generally designated 49, and a welding head or jaw assembly, generally designated 50.

The electrode wire 28 is wound upon a spool 51 with its broad face against the spool and the electrode is then passed between conventional straightening rollers 52, 53 and 54, the latter one of which is adjustable relative to the other two in order to apply the desired amount of tension for straightening the wire. The wire then passes downwardly through feed rolls 55 suitably driven by a motor 56 mounted on the frame and preferably controlled in response to the voltage across the arc in a manner well known in the welding art.

The jaw assembly 50 is best shown in Figures 12 and 13 and it comprises a rectangular metal block 57 having a central bore 58 lined with a wear-resistant sleeve 59 and providing an axial circular passage 60 of sufficient diameter to permit the electrode wire 28 to rotate about its longitudinal axis without restraint.

The lower portion of the welding head block 57 is bifurcated to receive a fixed contact block 61 rigidly supported in place by bolts 62 and a movable contact block 63 pivoted at the top about a bolt 64 and urged inwardly at the bottom by a leaf spring 65 secured at its upper end to the welding head block 57, as shown at 66, and pressing at its lower end against the lower portion of the contact block 63. The pressure exerted on the block 63 through the spring 65 is adjusted by a wing nut 67 and the stud 68 carrying the wing nut 67 also serves as a terminal post for bringing in the current to the electrode through a flexible braided connector 69 extending from the stud 68 to the contact block 63, as shown in Figure 12.

The opposed faces of the contact blocks 61 and 63 are shaped to conform to the oblong cross section of the electrode wire 28 with the exception that the shoulders 70 and 71 are spaced apart a distance somewhat in excess of the longer sides of the electrode to be certain that no binding will take place. The recessed walls 72 and 73 of the contact blocks 63 and 61, respectively, which engage the broad or flat sides of the electrode 28 are substantially flat so that the mating of these two surfaces with the corresponding surfaces of the wire insures a large area of contact between the blocks 61 and 63 and the wire, thereby holding down to a minimum the electrical resistance at the point of entry of the current into the electrode.

When a round wire or electrode is used, it is necessary to have the coacting walls of the contact blocks formed of slightly greater radius in order to accommodate variations in the diameter of the wire with the result that theoretically only a small contact area is provided between the contact blocks and the electrode, i. e., at the point of tangency. Using a flat electrode of the type herein disclosed with coacting planar surfaces on the contact blocks, it is possible to materially reduce the contact resistance at the point of introducing the current into the electrode.

The upper end of the welding head block 57 is provided with a circular stub shank 74 which is rotatably supported from the frame 48 by a split collar 75 welded or otherwise secured to the frame 48 and adapted to firmly clamp the welding head 50 in any desired angular position. The split collar 75 has laterally extending flanges 76 which may be forced together by a screw clamp 77 to firmly grip the stub shaft 74 of the welding head.

It will be noted that the frame 48 which rises from the bed 40 lies in a plane which is at approximately 45 degrees to the line of travel of the work holder carriage 41 (see Figure 11). The reason for this is because the welding head may then have its normal or neutral position, as shown in Figures 9, 10 and 11, with the major and minor axes of the electrode (as viewed in cross section) at an angle of 45 degrees to the joint being welded. To bring the major axis in line with the joint being welded, it is only necessary to rotate the head through an angle of 45 degrees, and to place the major axis across the joint, the welding head is rotated in the other direction through an angle of 45 degrees from the normal position. This means that the electrode wire 28 need only be twisted through an angle of 45 degrees from its normal unstressed position which thereby avoids problems of flaking off of the flux, increased wear on contact blocks, etc., which are inevitably present if the wire is turned through an angle of 90 degrees from its unstressed position.

Since the wire 28 is free to rotate within the sleeve 60 of the welding head 50, it will be seen that when the welding head is turned through an angle of 45 degrees in either direction, the twist to the wire is applied through the contact blocks 61 and 63 and the twist can be absorbed between the contact blocks and the feed rolls 55 without undue strain.

For convenience in rotating the head 50, a handle 78 may be provided, as best shown in Figure 10.

If a uniform thickness of weld material is to be laid down for different angular positions of the welding head, it is necessary to vary the speed of travel of the carriage 41 relative to the electrode. This may be done manually in any suitable manner but preferably it is done automatically so, that for any particular weld being made, once the proper speed of welding has been established, the correct proportional speed will be automatically established as the welding head is rotated through any given angle. This may be accomplished in a number of ways and, for the purpose of illustration, one such way is shown in Figures 9, 14, 15 and 16, referred to herein as by electrical control, and another way is shown in Figure 17 which may be considered as a mechanical control. In both of these devices means are provided for setting the speed of travel of the carriage independently of any other factor and then imposing upon such speed such variations as are desirable by reason of the changed angular position of the electrode.

It is not intended that the speed control devices hereinafter described should be one hundred per cent accurate because the welding speed is not that critical but is sufficient that for a given change in the angular position of the electrode a proportionate increase or decrease in the welding speed should be automatically effected to bring the speed to approximately optimum conditions.

Referring now to the electrical control form of the speed changing device (Figures 9, 14, 15 and 16), it will be seen that the principal elements thereof include a cam 85 welded or otherwise secured to the welding head 50, a logarithmic rheo-, stat 86 which is characterized by its generally logarithmic properties of effecting the same percentage changes in the speed of motor 43 for equal increments of movement of the rheostat arm, the rheostate 86 being connected in series with the motor 43 and a suitable source of electrical power indicated at 88. A switch 89 controls the motor circuit through the rheostat and it is understood that suitable switching devices would be provided for the welding current, either independent of or in conjunction with the starting switch 89 for the motor 43.

By referring to Figures 12 and 13, it will be seen that the cam 85 is of substantially the same cross-sectional shape as the electrode 28 but is in magnified scale and set 90 degrees out of phase therewith. The portion of the cam 85 which should conform to the shape of the electrode lies above and to the right (Figure 13) of the minor and major axes, respectively, of the electrode 28, so that the used portion of the cam extends from the intercepts of such axes with the edges of the cam and comprises the peripheral surface of the cam extending from the point 90 to the corner 91 and thence to the point 92 (Figure 13). Assuming that the breadth of the electrode 28 along the major axis is twice the width of the electrode along the minor axis, the distance from point 90 to the corner 91 should then be twice the distance from the corner 91 to the point 92.

The rheostat 86 is automatically varied by movement of the cam 85 through a cam follower 93 supported in ways 94 and 95 which form the end blocks for the rheostat itself. When the welding head 50 is turned in a clockwise direction to bring the major axis of the electrode at right angles to the joint being welded, the cam follower is at the point 90 on the cam (as shown in Figure 15); and when the welding head is rotated in a counterclockwise direction to the other limit of its travel with the major axis of the electrode aligned with the joint, the cam follower will be at the point 92 of the cam 85 (Figure 13).

The cam follower is urged against the cam by a spring 96 which is bottomed on the way 94 and has its other end engaging a pin 97 in the follower. The follower is slotted, as shown at 98, so that the rheostat arm, generally designated 99, comprising a rider 100 and rheostat finger 101 may be adjusted along the follower. To this end the rider 100 is provided with depending flanges 102 having aligned openings 103 to receive a clamping screw 104.

A lock pin 79 is mounted through a hole in way 94. This pin is adapted to engage a recess 80 in follower arm 93. Pin 79 has a knurled handle 81 and is threaded into a leaf spring 82. The leaf spring 82 is suitably mounted on way 94, as by means of a screw 83. When it is desired to lock follower 93 out of contact with cam 85, for example, when it may be desired to remove the welding head 50 from the frame, it is only necessary to manually push the follower back into the ways, whereupon pin 79 will be displaced outwardly against the tension of the spring 82 by contact with a sloping shoulder 84 in the end of slot 98. When the follower is pushed sufficiently into the way, pin 79 will be urged into recess 80 by the spring, and the follower will be locked in a retracted position. To release the follower the operator need only grasp handle 81 to pull pin 79 out of engagement with recess 80.

The rheostat 86 has a special winding 105 which taken in conjunction with the characteristics of the motor causes the same percentage change in the motor speed for equal increments of movement of the rheostat arm along the winding. This logarithmic relationship is indicated by the scale 106.

The advantage for employing a rheostat having this particular relationship may be explained by the following examples. Assuming the use of a rod, the length of the sides of which bear a 1 to 2 relationship to each other, it will be seen that the speed of travel when the major axis is parallel to the relative line of travel should be twice as great as when the minor axis is parallel to such line of travel.

If conventional motor control mechanism were used, say if such a type that, taken in conjunction with the motor characteristics, a movement of one inch of the rheostat arm would produce a change of 20 inches per minute on the travel of the carriage; and if with this were used a cam having a difference of one inch in throw between it major and minor axes; then, for a slow speed setting of 20 inches per minute the high speed setting would be 40 inches per minute which would be the correct relationship for the 1 by 2 rod. However, if it were desired to have the slow speed setting at any other value, say 40 inches per minute, then the remainder of the setting of the control speed would be incorrect. In this last example the high speed setting would be 60 inches per minute, which is a 50% increase rather than the 100% increase required for a 1 by 2 rod.

For this reason the logarithmic control illustrated and described is used. In the particular logarithmic scale 106 illustrated in Fig. 14, the scale is 4 32/32 inches long. This resistance is such that, taken in conjunction with the motor characteristics, a movement (to the right) of the wiper arm 99 of 1 32/32 inches will result in a 100% increase in speed of travel, no matter what the original setting of the wiper arm may have been (providing, of course, that the movement is within the limits of the resistor).

Thus, if a 1 by 2 rod were to be used in the apparatus illustrated, the difference in throw between points 90 and 92 on the cam would be 1 32/32 inches. If a 1 by 3 rod were to be used, the difference in throw of the cam would be 2 1/2 inches, while for a 1 by 4 rod the difference would be 2 61/64 inches. With a cam having the proper throw all that the operator is required to do is to pre-set contact 101 to the proper value for the first pass, and the speed of travel for the following passes will be automatically regulated. Such pre-setting is done by loosening handwheel 104 and adjusting the rider 100 for the proper speed of travel. An aperture 87 is provided in arm 99 to act, in conjunction with scale 106, as an indicator for the setting of the resistor wiper.

It can be demonstrated that for a welding electrode of oblong cross section, the welding speed should be a function of the length of the portion of the relative line of travel intercepted by the cross section of the welding electrode. By referring to Figures 3–8 inclusive, it will be seen that when the electrode has its major axis aligned with the axis of the groove, the intercepted line of travel is equal to the length of the broad face of the electrode; when the electrode is positioned with its minor axis 26 aligned with the axis of the groove, the intercepted line of travel is equal to the narrow face of the electrode. For any intermediate angular position of the electrode, the length of the intercepted line of travel will vary according to the angle. For example, in Figures 5 and 6, when the electrode is positioned at 45 degrees, the intercepted line of travel is indicated by the length of the line 107, and the preferred welding speed is a function of such length. For the extreme right angle positions, i. e., with the major axis of the electrode parallel to the line of travel and with it at right angles to the line of travel, the speed of travel is proportional to the length of the sides. If one side of the electrode is three times that of the shorter side, the welding speed when the electrode is positioned with its major axis across the joint should be one-third the speed at which welding is done with the major axis aligned with the joint or seam.

It will be apparent that if the head 50 were turned so that the relative line of travel is parallel to a diagonal of the rod, the cam feeler would be resting on the corner 91 (Figure 13) of the cam, and that in such a case, the speed of travel would be considerably greater than at any other angular position of the rod. Due to the pointing of the end of the cam feeler, such an exact setting is impracticable, and normally such angular position would not be required. When welding rods are used of such proportions that it seems necessary to use an angular setting of the head 50 which brings the diagonal of the rod parallel to the relative line of travel, it may be desirable to round off the corner 91 of the cam, to achieve smoothness of action.

The reason that the cam 85 is 90 degrees out of phase with the electrode is because the cam follower moves in a plane at right angles to the line of travel of the work; if the cam follower and associated rheostat mechanism were displaced through an angle of 90 degrees so that the cam follower would move in the same plane as the axis of the groove, the cam would be positioned so as to be in phase with the electrode itself.

In the form of the invention shown in Figure 17 in which a mechanical device is used for obtaining a similar result, the cam follower 110 has a rack 111 which is in mesh with a pinion 112 mounted on a shaft 113 carrying a cam 114 which is angularly adjustable on the shaft 113 by means of a set screw 115. A second cam follower 116 rides upon the cam 114 and is connected to a block 117 carrying a friction wheel 118 which is driven from a horizontal disc 119 attached to the shaft of a motor 120. Rotation of the friction wheel 118 is transmitted to the work holder carriage 41 through a splined shaft 121, gear box 122, flexible shaft 123, pinion 124 to the rack 125 mounted on the bottom of the work holder carriage. Suitable springs 126 and 127 are provided to yieldingly urge the cam follower 116 against the cam 114, and it is obvious that as the cam follower 110 is moved outwardly by coaction with the cam 85, the friction wheel 118 is also moved outwardly to increase the speed of drive for the work holder carriage.

The cam 114 is preferably designed so that for equal increments of angular movement, the ratio between the adjacent radii is a constant, i. e., if the radii $R_1$, $R_2$, $R_3$, $R_4$ and $R_5$ are of equal angular displacement, the ratio of $R_2$ to $R_1$, of $R_3$ to $R_2$, of $R_4$ to $R_3$, of $R_5$ to $R_4$ all equal the same constant.

Because of this relationship, the desired speed of travel for the carriage 41 may be first established by setting the cam 114 to whatever angular position is required to achieve the desired normal speed of the carriage, and, thereafter any change of position of the electrode will automatically vary the relative speed of travel between the electrode and the work in accordance with the desired functional relationship, namely, the length of that relative line of travel as extended through the center of the electrode and intercepted by the cross-sectional boundaries of the electrode.

The same result may be achieved without the use of the special cam 114 by having the cam follower 110 connected directly to the block 117 with the friction wheel 118 specifically located the same distance from the center of the disc 119 that the end of the cam follower 110 is spaced from the center of the electrode 28. By providing a rheostat control for the motor 120, the speed of the carriage travel may be preset for any given position of the electrode and thereafter changes in the angular position of the electrode will automatically effect the desired changes in speed of the carriage travel.

The terms "continuous wire electrode," "automatic wire" and the like are used throughout the specification and claims in a broad sense and do not imply an electrode of any given length. Likewise, the expression that the work and electrode have relative movement is used in a broad sense and implies a variety of ways in which this result may be accomplished.

I claim:

1. In an automatic welding machine, the combination of a frame, means for moving the work along a line relative to the frame, a continuous wire electrode of oblong cross section, power driven feed rolls for feeding the wire to the work, a welding head mounted on the frame and through which the electrode passes in moving to the work, contact jaws having an opening therebetween of substantially the same configuration as that of the electrode for gripping the electrode and for feeding current laterally into the electrode, said jaws being rotatable with respect to the line of movement to the work whereby the electrode may be held in different positions of rotation by the jaws to lay down welds of different widths.

2. In an automatic welding machine, the combination of a frame, a continuous wire electrode of oblong cross section, power driven feed rolls for feeding the wire to the work, a welding head mounted on the frame and through which the electrode passes in moving to the work, contact jaws having an opening therebetween of substantially the same configuration as that of the electrode for gripping the electrode and for feeding current laterally into the electrode, said jaws being rotatable with respect to the longitudinal axis of the electrode whereby the electrode may be held in different positions of rotation by the jaws to lay down welds of different widths, said jaws normally positioning the electrode over the seam to be welded with the major and minor axes of the oblong cross section substantially at an angle of 45 degrees to said seam.

3. In an automatic welding machine, the combination of a frame, a continuous wire electrode of oblong cross section, power driven feed rolls for feeding the wire to the work, a welding head mounted on the frame and through which the electrode passes in moving to the work, contact jaws having an opening therebetween of substantially the same configuration as that of the electrode for gripping the electrode and for feeding current laterally into the electrode, said jaws being rotatable with respect to the longitudinal axis of the electrode whereby the electrode may be held in different positions of rotation by the jaws to lay down welds of different widths, said jaws normally positioning the electrode over the seam to be welded with the major and minor axes of the oblong cross section substantially at an angle of 45 degrees to said seam, and being adapted to be rotated in either direction through an angle of approximately 45 degrees to position the major axis of the electrode cross section either substantially parallel with or substantially at right angles to said seam.

4. In an automatic welding machine, the combination of a frame, a continuous wire electrode of oblong cross section, power driven feed rolls for feeding the wire to the work, a welding head mounted on the frame and through which the electrode passes in moving to the work, rotatable contact jaws in the head for feeding current laterally into the electrode, said electrode of oblong cross section having its two longer sides substantially flat, and said contact jaws comprising opposed flat surfaces at least one of which yieldingly engages said longer sides.

5. A continuous feed welding machine including a frame, a welding electrode, power driven feed rolls, an electrode contact, and an electrode contact holder rotatably mounted on said frame, said welding electrode being of oblong cross section, said electrode contact having an internal shape substantially the same as the external shape of said cross section of the electrode, said frame, feed rolls, contact holder and contacts being normally mounted at an angle of 45 degrees from the line of relative travel between the welding machine and the work to be welded, whereby the contact holder and the contacts may be rotated 45 degrees in one direction to produce the widest weld of which the electrode is capable and rotated 45 degrees in the other direction to produce the narrowest weld of which the electrode is capable.

6. In a continuous feed welding machine adapted to utilize a welding electrode having greater breadth than width as viewed in cross section, a frame supporting the welding head, traversing means to provide movement of the welding electrode relative to the work to be welded in the direction of the line of the weld to be made, an electric motor driving said traversing means, an electrode guide rotatively attached to said frame whereby said electrode may be rotated through an angle of 90 degrees to produce welds of varying widths, an indicator operatively connected to the guide to indicate appropriate relative motor speeds for various degrees of rotation of the electrode, and a rheostat electrically connected to the motor whereby the speed of said motor may be varied as a function of the relative length of the line defined by the interception of the cross section of the electrode with the line of movement as produced through said electrode.

7. In an automatic welding machine, the combination of a frame, a work holder movable relative to the frame, means including a motor for causing the work holder and the work supported thereon to move relative to the frame at predetermined speeds, a continuous wire electrode of oblong cross section adapted to be fed to the work to produce a welded seam therein, a welding head mounted on the frame through which the electrode passes in moving to the work, contact means in the head for feeding current laterally into the the electrode, means associated with the head for rotating the electrode about its longitudinal axis, and means controlled by the rotary position of the electrode relative to the frame for varying the speed of travel of the work holder to automatically produce a weld seam of substantially uniform thickness regardless of the rotary position of the electrode relative to the frame.

8. In an automatic welding machine, the combination of a frame, a work holder movable relative to the frame, means including a motor for causing the work holder and the work supported thereon to move relative to the frame at predetermined speeds, a continuous wire electrode of oblong cross section adapted to be fed to the work to produce a welded seam therein, a welding head mounted on the frame through which the electrode passes in moving to the work, contact means in the head for feeding current laterally into the electrode, means associated with the head for rotating the electrode about its longitudinal axis, and means controlled by the rotary position of the electrode relative to the frame for varying the speed of travel of the work holder to automatically produce a weld seam of substantially uniform thickness regardless of the rotary position of the electrode relative to the frame, said last-named means including a logarithmic rheostat controlling the motor which drives the work holder and adapted to produce equal percentage changes in the motor speed for equal increments of movement of the rheostat arm.

9. In a automatic welding machine, the combination of a frame, a work holder movable relative to the frame, means including a motor for causing the work holder and the work supported thereon to move relative to the frame at predetermined speeds, a continuous wire electrode of oblong cross section adapted to be fed to the work to produce a welded seam therein, a welding head mounted on the frame through which the electrode passes in moving to the work, contact means in the head for feeding current laterally into the electrode, means associated with the head for rotating the electrode about its longitudinal axis, and means controlled by the rotary position of the electrode relative to the frame for varying the speed of travel of the work holder to automatically produce a weld seam of substantially uniform thickness regardless of the rotary position of the electrode relative to the frame, said last-named means including means for presetting the speed of travel of the work holder relative to the frame and automatically modifying such speed in inverse relation to the width of the electrode presented to the seam as the electrode is moved longitudinally along the seam.

10. In an automatic welding machine, the combination of a frame, a work holder movable relative to the frame, means including a motor for causing the work holder and the work supported thereon to move relative to the frame at predetermined speeds, a continuous wire electrode of oblong cross section adapted to be fed to the work to produce a welded seam therein, a welding head mounted on the frame through which the electrode passes in moving to the work, contact means in the head for feeding current laterally into the electrode, means associated with the head for rotating the electrode about its longitudinal axis, means controlled by the rotary position of the electrode relative to the frame for varying the speed of travel of the work holder to automatically produce a weld seam of substantially uniform thickness regardless of the rotary position of the electrode relative to the frame, said last-named means including a cam shaped substantially in accordance with the cross-sectional shape of the electrode but 90 degrees out of phase therewith, and speed control means operated from said cam through a device interposing a logarithmic relation between the throw of the cam and the speed of travel of the work holder.

11. In an automatic welding machine, the combination of a frame, a work holder movable relative to the frame, means including a motor for causing the work holder and the work supported thereon to move relative to the frame at predetermined speeds, a continuous wire electrode of oblong cross section adapted to be fed to the work to produce a welded seam therein, a welding head mounted on the frame through which the electrode passes in moving to the work, contact means in the head for feeding current laterally into the electrode, means associated with the head for rotating the electrode about its longitudinal axis, means controlled by the rotary position of the electrode relative to the frame for varying the speed of travel of the work holder to automatically produce a weld seam of substantially uniform thickness regardless of the rotary position of the electrode relative to the frame, said last-named means including a cam shaped substantially in accordance with the cross-sectional shape of the electrode, and speed control means operated from said cam through a device interposing a logarithmic relation between the throw of the cam and the speed of travel of the work holder, said speed control means including a rotary disc and a friction wheel in engagement therewith at variable distances from the center of said disc.

12. In an automatic welding machine, the combination of a frame, a work holder movable relative to the frame, power means for causing the work holder and the work supported thereon to move relative to the frame at pre-determined speeds, a continuous wire electrode of oblong cross section adapted to be fed to the work to produce a welded seam therein, a welding head mounted on the frame, contact jaws on the head for gripping the electrode and for feeding current laterally into the electrode, said jaws being rotatable about the longitudinal axis of the electrode, and means responsive to the angular position of said electrode for varying the relative speed of movement between the welding head and the work as a function of the length of the relative line of travel intercepted by the cross section of the electrode.

13. In an automatic welding machine, the combination of a frame, a work holder movable relative to the frame, power means for causing the work holder and the work supported thereon to move relative to the frame at pre-determined speeds, a continuous wire electrode of oblong cross section adapted to be fed to the work to produce a welded seam therein, a welding head mounted on the frame, contact jaws on the head for gripping the electrode and for feeding current laterally into the electrode, said jaws being rotatable about the longitudinal axis of the electrode, and means for varying the relative speed of movement between the welding head and the work in accordance with the angular position of said electrode, said last-named means including a cam rotatable with the electrode, and a logarithmic device operated from said cam for interposing a logarithmic relation between the throw of the cam and the speed of travel of the work holder, whereby a change of a particular percentage in the throw of the cam, due to rotation of the electrode, will produce a substantially equal percentage change in the speed of travel.

14. In an automatic welding machine, the combination of a frame, a work holder movable relative to the frame, power means for causing the work holder and the work supported thereon to move relative to the frame at pre-determined speeds, a continuous wire electrode of oblong cross section adapted to be fed to the work to produce a welded seam therein, a welding head mounted on the frame, contact jaws on the head for gripping the electrode and for feeding current laterally into the electrode, said jaws being rotatable about the longitudinal axis of the electrode, and means for varying the relative speed of movement between the work holder and the electrode in accordance with the angular position of said electrode, said last-named means including a cam rotatable with the electrode, a feeler associated with the cam for determining from the cam the length of the relative line of travel intercepted by the cross section of the electrode, and speed control apparatus operating from said feeler and including a logarithmic device for interposing a logarithmic relation between the throw of the cam and the speed of travel of the work holder, whereby a change of a particular percentage in the throw of a cam, due to rotation of the electrode, will produce a substantially equal percentage change in the speed of travel.

15. In a continuous feed welding machine adapted to utilize a welding electrode having a greater breadth than width as viewed in cross section, a frame supporting the welding head, traversing means to provide movement of the welding electrode relative to the work to be welded in the direction of the line of the weld to be made, an electric motor driving said traversing means, an electrode guide rotatively attached to said frame whereby said electrode may be rotated through an angle of approximately 90 degrees to produce welds of varying widths, a rheostat electrically connected to said motor to vary the speed of the motor, means including an actuating member to vary the rheostat in response to the relative length of the line defined by the interception of the cross section of the electrode with the line of movement as produced through the electrode whereby the speed of travel of the traversing means will vary as a function of the relative length of said intercepted line.

16. In a continuous feed welding machine adapted to utilize a welding electrode having greater breadth than width as viewed in cross section, a frame supporting the welding head, traversing means to provide movement of the welding electrode relative to the work to be welded in the direction of the line of the weld to be made, an electric motor driving said traversing means, an electrode guide rotatively attached to said frame whereby said electrode may be rotated through an angle of approximately 90 degrees to produce welds of varying widths, a rheostat member electrically connected to the motor to vary the speed of the motor, and means for varying the relative speed of movement between the welding head and the work in accordance with the angular position of said electrode, said last-named means including a cam rotatable with the electrode, and a logarithmic device operated from said cam for interposing a logarithmic relation between the throw of the cam and the speed of travel of the work holder, said logarithmic device being operatively connected to said motor through said rheostat member, whereby a change of a particular percentage in the throw of the cam, due to rotation of the electrode, will produce a substantially equivalent percentage change in the speed of travel of said motor and the relative movement between the welding head and the work.

ARTHUR A. BERNARD.

REFERENCES CITED

The following references are of record in the file of this patent:

UNITED STATES PATENTS

| Number | Name | Date |
|---|---|---|
| 1,508,738 | Whiting | Sept. 16, 1924 |
| 1,873,847 | Miller | Aug. 23, 1932 |
| 2,438,593 | Wright | Mar. 30, 1948 |